United States Patent [19]

Hansen

[11] 3,743,512

[45] July 3, 1973

[54] MONOGLYCERIDE PRODUCT AND METHOD OF PREPARING THE SAME

[76] Inventor: Francis Frederick Hansen, deceased late of Walla Walla, Wash. by Ethel F. Hansen, 224 E. Poplar Street, Walla Walla, Wash. 99362

[22] Filed: Sept. 16, 1970

[21] Appl. No.: 72,802

Related U.S. Application Data

[63] Continuation-in-part of Ser. No. 688,024, Dec. 5, 1967, abandoned.

[52] U.S. Cl.................................. 99/91, 99/118 P
[51] Int. Cl.............................................. A21d 2/16
[58] Field of Search ............................ 99/91, 118 P

[56] References Cited
UNITED STATES PATENTS

| 3,362,829 | 1/1968 | Landried et al. .................. 99/91 X |
| 2,952,545 | 9/1960 | Pfrengle et al..................... 99/91 X |
| 2,978,329 | 4/1961 | Cochran et al. ................... 99/91 X |

Primary Examiner—Raymond N. Jones
Assistant Examiner—James Robert Hoffman
Attorney—Parmelee, Utzler and Welsh

[57] ABSTRACT

Hard distilled monoglyceride either alone or in combination with other modifiers in a ground-up condition is mixed with wheat starch or other dry particles and the mixture reduced to an impalpable powder in a fluid energy impact type of mill to an average fineness of less than 10 microns. In this process the starch or other dry particles become coated or smeared with a film of the monoglyceride. The preferred material is 50 percent distilled monoglyceride and 50 percent wheat starch or wheat flour. Fifty percent of monoglyceride used in this way is superior to 100 percent finely ground monoglyceride produced in the same fashion. About 1 percent of the preferred product is used in a standard bread formula to each 100 lbs. of flour.

8 Claims, No Drawings

MONOGLYCERIDE PRODUCT AND METHOD OF PREPARING THE SAME

This application is a continuation-in-part of my copending application Ser. No. 688,024, filed Dec. 5, 1967 now abandoned in favor of this application and the invention is for an additive for use in the preparation of foods, particularly yeast-raised baked goods, and for the method of preparing it.

Various additives are used in the baking industry for improving the quality of commercially baked bread, rolls and cake for making them soft and retarding the staling of the bread or other product, and/or otherwise improving it in various ways, including the improvement of its volume, and hence its texture. For many years I have been actively concerned with this area of the baking industry and I have been particularly impressed with the possibilities of effectively and economically using commercial grades of distilled monoglycerides of fat-forming fatty acids as an anti-staling ingredient, the use of which is approved by the Federal Bread Standards promulgated by the Department of Health, Education and Welfare. Some of the more common ones are the reaction product of glycerine with fully hydrogenated edible tallow, edible stearic acid, fully hydrogenated lard and various hydrogenated vegetable oils, typically cottonseed oil, peanut oil, safflower, soybean and like oils, or combinations thereof. While the use of these hard distilled monoglycerides as an additive for bread have therefore been known for some time, they are rather ineffective as a bread softener and anti-staling additive in the flake or beaded form in which they are commercially available. In my U.S. Pat. No. 3,216,829, granted Nov. 9, 1965 I have disclosed a process in which the monoglyceride is emulsified with water to make a stable creamy paste-like preparation, and in U.S. Pat. No. 3,282,705 I disclosed an improvement wherein hydroxylated lecithin is introduced into the emulsion. Both have proved to be good, effective additives. However the industry has not favorably received paste-like products that must be shipped in drums, scooped from the drum and weighed to the required weight, particularly since some additives of a free-flowing powder-like character were available, particularly one comprising calcium stearyl lactate which is especially effective for improving volume, but less effective than some other products to retard staling. In my copending application Ser. No. 729,383, filed May 15, 1968, now U.S. Pat. No. 3,549,382 granted Dec. 22, 1970 there is disclosed the process of making a highly useful powdered product by drying the paste-like monoglyceride-hydroxylated lecithin preparation to a powder, but the preparation of the emulsion with water and the subsequent removal of the water to make a dry powder increased the cost of the product as did the capital investment in equipment required to produce it.

Additionally the product so prepared did not produce the amount of increase in volume that the preparation comprising calcium stearyl lactylate produced. It was then proposed to improve volume by using with monoglyceride and hydroxylated lecithin some ethoxylated monoglyceride, the use of which had recently been approved in the bread standard by H.E.W. This combination was made by melting together the three principal ingredients and spraying the melted mix into a cloud-like atmosphere of wheat starch inside a cooling tower. The starch became attached to the exterior of the droplets as they were solidifying to prevent the congealed droplets from freely lumping and coalescing. I am informed that this product may have given some increase in volume, but with little or no improvement in softness, and in continuous dough processes used in many large bakeries, induced such voluminous foam in the "brew tank" as to make it useless.

In my early experimental work with distilled monoglyceride I had some of it ground. I experimented with grinding monoglyceride alone, without starch or other additive, but I found that the finely-ground monoglyceride per se was substantially ineffective as a bread softener, and even though it had the appearance of a powder, the particles made dark specks in the crust as the temperature in the dough increased during baking to the point where the crust is brown.

However, my success with the freeze-drying and drum-drying and subsequent grinding of the hydroxylated lecithin-monoglyceride emulsion as above referred to encouraged me to further experimentation of powdering the commercial monoglyceride without first emulsifying it. Commercial distilled hard monoglyceride, i.e., a product comprised principally of the monoglyceride of one or more fat-forming fatty acids that are saturated or fully hydrogenated and solid at room temperature—is available in the form of granules or beads resembling to a considerable extent the appearance of granulated white sugar, but unlike sugar, the particles or grains have a soap-like or greasy feel to the touch.

I have now found that hard distilled monoglyceride may be reduced to a powder by fluid energy or fluid jet impact powdering methods to a remarkable degree of fineness—that is with no particles being above 80 microns, and more than about 90 percent of it being below 10 microns, with much of it being below 5 microns. This material provides an excellent emulsifier or bread softener.

I have discovered, however, that if the commercial hard distilled monoglyceride as above described is mixed with ungelatinized starch—preferably normal wheat starch or wheat flour, and preferably in roughly equal amounts by weight and the mixture passed through a fluid energy or fluid impact mill and reduced to a condition where about 85 to 90 percent of the particles is below the 15 to 10 micron size range, at least 80 percent being below 10 microns and in excess of 50 percent is under 5 microns, an unexpectedly improved product will result. Certain hard monoglycerides are preferred for my invention because they will cause less buildup in the air jet impact mill used for powdering the mix, these being principally monoglycerides derived from edible stearic acid, fully hydrogenized lard, fully hydrogenized cottonseed oil and combinations thereof. Monoglycerol stearate is readily available and most preferred.

This impalpably fine powder so formed is free-flowing, even after being stored for months. In some cases small clusters of particles may appear, apparently due to static electricity, and these particles quickly disperse, but as hereinafter described, I may use an antistatic ingredient in the mix. In test after test it has produced bread with a total score in the range of 93–94 according to standard scoring procedures where 100 is the theoretical maximum, and it has proved in such tests to score higher both as to volume and softness than controls that are baked with additives which are presently considered to be the best and most widely used additives now commercially available. Early tests by an independent testing laboratory indicated that in the conventional sponge and dough baking procedure only 50 percent as much monoglyceride was required to give the same results when it is smeared over starch particles as 100 percent monoglyceride alone, but subsequent tests in continuous baking has shown this not to be so where the monoglyceride is freshly milled in a fluid energy mill, the results achieved with 0.5 of the monoglyceride comparing favorably with 1 percent of the combination of 50 percent starch and 50 percent monoglyceride. However, after aging for a month or few weeks the milled monoglyceride without the starch is not satisfactorily useable because of the agglomeration which takes place. Moreover, this use of this product appears to result in only normal foaming in the brew tank in the continuous mix process commonly known in the industry as "Baker dough" process.

I attribute this synergistic effect of the starch and monoglyceride to at least two possible reasons. The first is that when the mixture is being reduced to this very fine powdered condition by the fluid energy impacting of one particle against another, a thin film of monoglyceride, possibly only of molecular thickness, is spread or wiped over the starch particles. This is evident from the "feel" of the resulting powder which possesses the feel of the original monoglyceride, and from the known fact that the monoglyceride beads or grains can be smeared under pressure onto a hard, smooth surface. The starch or flour particles are initially not only harder but smaller than the softer beaded monoglyceride particles, for which reason the starch or flour particles readily acquire a film of the monoglyceride in the process of air impact or fluid energy grinding, and the cereal or other particles will also wipe against the walls of the apparatus onto which some of the monoglyceride is smeared. A second reason is that when the finely powdered undiluted fluid energy powdered monoglyceride per se is placed in water, it will stay indefinitely on the surface, and if the water is agitated the monoglyceride will again rise to the surface. The powder resulting from the starch-monoglyceride mix will diffuse through the water and remain dispersed after being violently agitated due presumably to the fact that starch is hydrophilic, whereas the monoglyceride by itself is not similarly dispersible. It is interesting to note that if the monoglyceride per se is first powdered in a fluid energy mill and then mixed with wheat starch or flour and again run through the fluid energy mill, the cereal particles are not as effectively coated or the product nearly as good as when the monoglyceride and cereal particles are first mixed and then powdered.

Another possible reason for the highly favorable results obtained with this product is more difficult to prove, but may be due to a change in the physical structure of the hard monoglyceride which melts at about 165°F. The so-called unstable Alpha form of monoglyceride is described in the extensive literature on the subject as being the form in which monoglyceride evidences the greatest anti-staling and other desirable properties. When monoglyceride is melted, it apparently reverts to the Alpha form, but after it again cools and congeals, it changes after several days back to the more stable Beta form. Thus as the dough prepared with this powder reaches a temperature of 165°F. in the oven, the thin film on the flour or starch particles melts. With an infinite number of cereal particles, as starch or flour, each with its film of monoglyceride, diffused through the dough—much more widely diffused in less concentrated and more minute quantities than where powdered monoglyceride alone is used—the melting, and subsequent cooling takes place throughout the dough where the Alpha form, changed in situ then exists to most effectively retain the moisture in a desirable phase—whatever the mechanics of the process may be—for a longer period of time.

While, as above explained, the distilled monoglyceride has been recognized and known for a long time as an available additive for bread and the bread standards have approved its use, its hydrophobic nature has mitigated against its use and heretofore various chemical compounds have been combined with it so as to provide a hydrophilic moiety or molecular group to render the monoglyceride more readily dispersable through the dough. Some such modification has been reesterification of the monoglyceride with diacetaltartaric acid. This product, known as TEM, and variations of it were widely used at one time. More recent modifications have been to react the monoglyceride with ethylene oxide to produce ethoxylated monoglyceride, or the combination of the monoglyceride with hydroxylated lecithin as disclosed in my U.S. Pat. No. 3,282,705 has been used. The present invention is unique in that with the present invention where the monoglyceride and starch grains or flour particles are impacted against each other in a current of air where heat is instantly removed, the softer monoglyceride particles rub a thin film of monoglyceride over the harder cereal derived particles. A hydrophilic material such as starch or flour is in this way physically combined with the monoglyceride without apparent change in the chemistry of the monoglyceride.

For all-around purposes and ease of measuring, a mixture of about 50 percent distilled hard monoglyceride which is a solid at normal room temperature and preferably one selected from the group above named and 50 percent wheat starch or flour is preferred. Such distilled monoglyceride normally comprises about 90 percent or higher monoglyceride with the balance being diglyceride and an inconsequential amount of triglyceride. It is the ester of an edible fatty acid having 16 to 22 carbon atoms, and which is saturated or fully hydrogenated, i.e., has an iodine number of 1 or below. It has a melting point of around 150° to 165°F. However, except for convenience and economy, the material might be prepared with the starch or flour-to-monoglyceride ratio in the range of perhaps 10 to 90 percent by weight of one to 90 to 10 percent by weight of the other. There seems at this time to be no advantage in either reducing the amount of the cereal powder, whether starch or flour, and increasing the weight of monoglyceride beyond the 50-50 ratio, nor does it seem to be advantageous to increase the weight of the cereal powder above a 50-50 ratio whereby more of the product must then be used in a dough mix to secure up to 0.5 percent monoglyceride equivalent in the dough.

Instead of wheat starch or wheat flour, both of which are normally present in bread, I may use corn starch. So also I may use vegetable starch. Insoluble, but wettable powdered materials such as starch or normal wheat flour are preferred since they will mix through the dough with their films of monoglyceride, but other dry powdered substances such as cane, beet and corn sugar or corn syrup solids, and certain salts or mixtures of the above with certain salts, as calcium phosphate, calcium carbonate, and calcium sulphate, the latter being a common ingredient in yeast food, etc. may be effectively used. In all cases, there is a powdered base or carrier having a thin film of monoglyceride smeared more or less completely over the exterior of the individual coated particles. The particles have an average size of $-10$ $\mu$ (microns) in diameter and principally 5 $\mu$ or less with substantially no particles exceeding 80 $\mu$. As above stated, there is a physical phenomenon evidencing an entirely unexpected synergistic effect between the dry solid particles and the monoglyceride, probably due to the fact that the monoglyceride is reduced to a thin, almost molecular film over the solid particles. The extreme thinness of the film is apparent from the fact that even though the particles carry a coating of monoglyceride 50 percent or more are 5 microns or under.

In addition to using 50 percent distilled monoglyceride and wheat starch or wheat flour prepared in a fluid energy or jet impact mill, I have melted the monoglyceride and mixed with it other materials such as hydroxylated lecithin, ethoxylated monoglyceride, and other materials, then cooled the mix, mechanically ground it to a coarse powder, and then mixed it with wheat starch and/or flour and had the mixture run through a fluid energy powdering mill, and I have also combined the monoglyceride in grinding with wheat starch and different proportions of powdered calcium stearyl lactate. For example, I combined 50 percent monoglyceride, 30 percent wheat starch and 20 percent calcium stearyl lactate. This was reduced to the fine condition herein described by impact powdering and the powdered product was tested by an independent laboratory (Doty Laboratories of Kansas City) and received an "excellent" rating with a score of 91, but appeared to be no different from bread baked at the same time using calcium stearyl lactate with no other additive. My preparation just described, while no better, was perhaps slightly cheaper, but even this score of 91 is lower than that repeatedly secured using 1 percent of the preferred and cheaper fluid energy powdered mix comprised of just 50 percent monoglyceride and 50 percent wheat starch or flour.

In another example, 45 percent of hard monoglyceride and 5 percent of "Kraft Pure Vegetable Oil" purchased in a local store, and which, like other brands presently sold, contains 0.001 percent of methyl silicone, were melted together at about 165°F., then cooled and coarse ground in a hand mortar. This coarse ground material was then combined with 50 percent of wheat starch and reduced by fluid energy impact grinding to an average fineness of $-10$ $\mu$. The resulting material was then tested in an independent laboratory in a continuous bread mix process. At mixer speeds of 175 r.p.m. to 185 r.p.m. it scored 91 against the theoretical 100, but at 195 r.p.m. it was 89. A primary purpose of the test, among other things, was to determine whether methyl silicone along with the oil might affect foaming.

A second mix was prepared with 50 percent wheat starch, 5 percent of vegetable oil as in the previous example, 5 percent hydroxylated lecithin and 35 percent monoglyceride. All of the ingredients except the wheat starch were combined at a temperature of about 165°F., and when all were melted, the mix was cooled, hand-ground in a mortar, and then combined with wheat starch and reduced to a powder of an average fineness of $-10$ $\mu$ in a fluid energy type mill. The final powder was tested using 1 percent of the powder in the same laboratory where the other tests were run, also for use in a continuous mix. At normal mixing head speeds of 175 r.p.m. and 185 r.p.m. the bread scored 93 and 94 against the theoretical 100, and at 195 r.p.m. it scored 92. In both this test and the preceding, the average on the standard seven-day compressibility test was 54.00 and 65.60 respectively, showing excellent anti-staling qualities.

Other satisfactory tests have been run in the same laboratory with different combinations of wheat starch and/or flour to which have been added other materials to determine the effect of other materials. These tests are not conclusive, but in general some addition materials detracted from a product made with 50 percent monoglyceride and 50 percent wheat flour or starch, but most indicated no outstanding improvement or detriment compared to the 50–50 powdered product. By substituting high protein flour for some of the wheat starch, the product was far less satisfactory. An excellent product for continuous mix was made using 45 percent wheat starch, 45 percent distilled hydrogenated cottonseed monoglyceride and 10 percent partially hydrogenated lard melting around 145°F. Moreover, the product showed no objectionable foaming in continuous mix tests.

Another test used 45 percent hydrogenated cottonseed monoglyceride, 45 percent wheat starch and 10 percent powdered edible stearic acid. This was a very good product, scoring 94 out of a possible 100 in continuous mix tests. In another test the stearic acid was reduced to 5 percent with the other two ingredients each increased to 47½ percent, and was also an excellent product. In similar tests 5 percent of lard flakes was substituted for 5 percent stearic acid and powdered in the same way. This, too, is a good product, as was another product wherein 5 percent calcium sulfate (an ingredient of yeast food) was substituted for stearic acid.

Both in the fluid energy powdering operation and subsequent storage of the dry powdered material in closed containers, the product frequently accumulates static electrical charges that induce the formation of loose clusters of coated particles. Edible stearic acid, lard flakes and calcium sulfate appear to be useful in eliminating or minimizing this objectionable phenomenon. They are compounds which may be used under the Federal bread standards, and do not adversely affect the product as a bread additive, since in all cases the volume score of the test was at or close to the possible maximum and the average compressibility over seven, and even eight days was exceptionally good, showing little loss in softness from day to day over the test period.

All tests were run against a standard control with the same formula in the control except for the use of the additive, and the recipes and procedures for both conventional and continuous mix processes were those generally used by Doty Laboratories for tests of this type and were those used in commercial bakeries. In all cases the laboratory had no knowledge of the ingredients or the composition or manner of making the additive.

The product made with wheat starch and monoglyceride appears to have an indefinite shelf life as long as it is sealed in air-tight drums. It is free-flowing, and unlike many additives, has no "off" taste. It is the most economical and effective way I have discovered after years of experimentation with bread softeners or so-called emulsifiers based on the use of monoglyceride to prolong the softness of bread and yeast-raised products and preserve, if not actually improve, loaf volume, flavor and texture. The product can be produced much more cheaply than the most successful products presently on the market, including those made according to my previous patents. I have used both opposed jet stream impact pulverizers as disclosed in U.S. Pat. Nos. 2,704,635 and 3,229,919, and fluid energy input pulverizers as described in "Industrial and Engineering Chemistry," Vol. 54 of February 1962, pps. 62–65 in an article titled "Extending the Use of Jet Mills." So far both appear to produce comparable products at comparable cost.

I claim:

1. A product for use in retarding the staling of yeast-raised bakery products in the form of a dry powder comprising particles of an edible base material selected from the group consisting of cereal flour and vegetable flour and cereal starch and vegetable starch and mixtures thereof wherein said particles have a film of a hard distilled monoglyceride wiped thereover and the size of the particles bearing said film is of an average below 10 microns with about 50 percent of said particles being 5 microns or under, the film-coated particles resulting from the milling together of the base particles and solid particles of the monoglyceride in a fluid energy type of mill where the mixed particles impact one another and impact the interior of the mill in a high velocity air current with the base particles being reduced in size while the solid particles of monoglyceride as the softer material impact the base particles to smear a film of monoglyceride thereover.

2. The product defined in claim 1 in which the coated particles contain from 5 to 10 percent calcium sulfate to retard agglomeration and balling of the coated particles in storage.

3. The product defined in claim 1 in which the monoglyceride is glycerol mono-stearate.

4. The method of producing a dry powder for use in the baking of yeast-raised bakery products to retard staling which comprises milling together in a fluid energy type mill base particles selected from the group consisting of vegetable flour and cereal flour and vegetable starch and cereal starch and solid particles of distilled monoglyceride to a finished average particle size of below 10 microns with at least 50 percent of the particles ranging in size from 5 microns downward wherein the solid particles of monoglyceride become smeared into a thin film over the base particles, the monoglyceride being not less than 10 percent or more than 90 percent by weight of the combined weight of the base particles and monoglyceride.

5. The method defined in claim 4 in which the weight of the monoglyceride and the weight of the base particles is approximately equal.

6. The method defined in claim 5 in which between 5 to 10 percent calcium sulphate in the ratio of the combined base material and monoglyceride is milled in the fluid energy mill along with the base particles and monoglyceride particles.

7. The method defined in claim 6 in which the distilled monoglyceride is a commercial product in which the particles are tiny beads and comprise about 90 percent monoglyceride with the balance being principally diglyceride.

8. The method defined in claim 7 in which flour used as base particles is a low protein flour.

* * * * *